Nov. 26, 1968  Z. J. ZEC  3,412,475

METHOD AND APPARATUS FOR DRYING THIN MEMBRANES

Filed Dec. 30, 1966

ZVONIMIR JUAN ZEC
INVENTOR.

BY *Louis Mok*

ATTORNEY

United States Patent Office 3,412,475
Patented Nov. 26, 1968

3,412,475
METHOD AND APPARATUS FOR DRYING
THIN MEMBRANES
Zvonimir Juan Zec, Los Altos Hills, Calif., assignor to Beckman Instruments, Inc., a corporation of California
Filed Dec. 30, 1966, Ser. No. 606,319
5 Claims. (Cl. 34—19)

ABSTRACT OF THE DISCLOSURE

A method and an apparatus for drying thin membranes in which the membrane is placed between a pair of moisture-absorbent sheets which in turn are inserted between a pair of apertured frame members suitably clamped together.

---

This invention relates generally to a method and an apparatus for drying thin membranes, for example, membranes used as support media in electrophoresis.

Electrophoresis support membranes, wetted as a result of the electrophoresis process, have heretofore simply been air dried or dried by placing them between sheets of paper and using a heavy object, such as a large book, for a weight. The prior drying techniques are slow and they may permit curling, wrinkling, or uneven drying of the membrane resulting in distortion of the electrophoresis pattern. The principal object of the present invention is to overcome these disadvantages.

Figure 1:
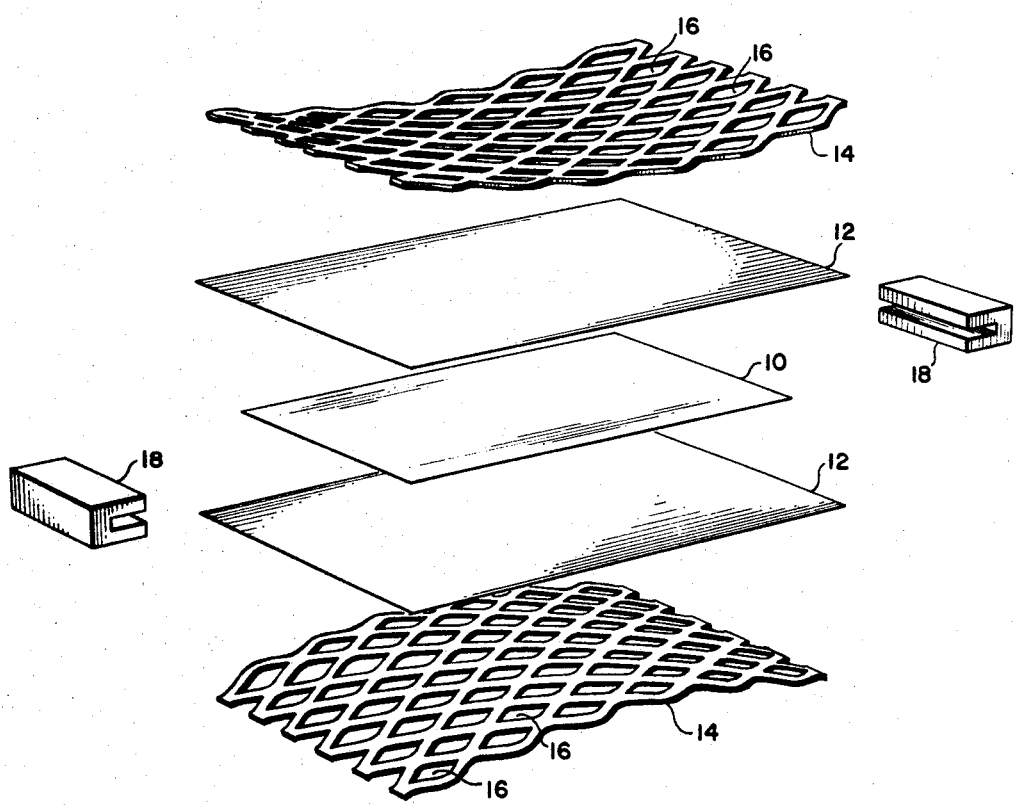
Figure 2:
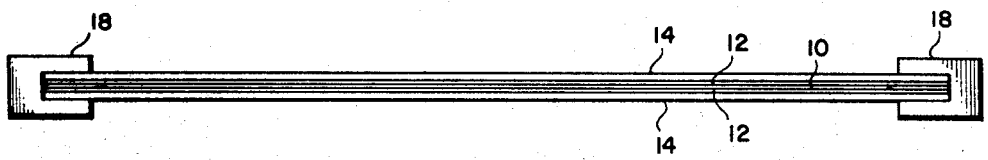

The novel features which are believed to be characteristic of the present invention are set forth with particularity in the appended claims. The invention itself, however, together with further objects and advantages thereof can best be understood by reference to the following description taken in connection with the accompanying drawings in which:

FIG. 1 is a perspective, exploded view of a membrane drying device which may be used to practice the present invention; and FIG. 2 is a side view of the device of FIG. 1 in the assembled form.

Turning now to the drawings, the reference numeral 10 designates a thin membrane of cellulose acetate, for example, used to support electrophoretic separations. In electrophoresis of the type employing a membrane as the support medium, the membrane is initially saturated with an electrolyte. The sample, containing the particles, such as protein, to be separated, is deposited on a portion of the surface of the membrane. A potential gradient is then applied across the membrane. Particles of different electrophoretic mobilities migrate at different rates forming an electrophoretic pattern of distinctive bands or zones. Following the electrophoresis run, the membrane is typically treated with a solution which simultaneously coagulates or fixes the protein and stains the membrane to bring out the electrophoresis pattern. Rinsing and drying then follow preparatory to quantitative analysis of the electrophoresis pattern by suitable means such as an optical scanner like that described in U.S. Patent No. 2,834,247 issued May 13, 1958, and entitled, "Optical Density Analyzing Apparatus."

Preferably, the drying process should not only be quick but also uniform across the surface of the membrane to prevent distortion of the electrophoretic pattern. The method and apparatus of the present invention, now to be described, may be used to achieve these ends.

The membrane 10 is sandwiched between a pair of moisture-absorbent sheets 12 which may be typically formed from ordinary blotter material. The three-layer lamination formed by the membrane 10 and the blotters 12 is placed between the convex surfaces of a pair of curved, flexible frame members 14. The frame members 14 may be fabricated of any suitable resilient, non-corrosible material such as a plastic or stainless steel. The frame members 14 include a plurality of apertures 16 to permit free circulation of air across the outer surfaces of the blotters 12. Obviously, the apertures may be of any desirable shape. For example, the frame members 14 depicted in the drawings are fabricated from commercially available stainless steel mesh having diamond-shaped apertures as shown. Where the frame members 14 are made of metal, the necessary curvature may simply be provided by prebending the member; where plastic is used as the construction material, the members 14 may be molded with a slight curvature therein.

The operation of the device will be readily apparent from inspection of the drawings. Generally, adjacent, spread ends of the members 14 curving away from the blotters 12, are held together by a suitable clamping means such as the U-shaped clip 18. Although a particular form of clamping device 18 has been shown, it is obvious that other clamping or latching means may be used. The clips described, however, are preferable since they permit the drying device to be readily assembled and disassembled.

With the ends of the frame members drawn and clamped together, a flat assembly is formed such as that shown in FIG. 2, in which uniform pressure is applied across the surfaces of the blotter-membrane lamination thereby preventing wrinkling and distortion of the membrane 10 during drying. The moisture absorbed by the blotters 12 from the membrane 10 evaporates and escapes to the atmosphere through the aperture 16. Forced warm air circulation through the apertures accelerates the drying process and complete drying of cellulose acetate membranes has been accomplished in substantially less than twenty minutes.

It will be obvious to those skilled in the art that various modifications may be made to the specific exemplary embodiments of the invention described. While particular embodiments have been discussed, it will be understook that the invention is not limited thereto and that it is contemplated to cover in the appended claims any such modifications as fall within the true spirit and scope of the invention.

What is claimed is:
1. A method for drying thin membranes, such as those used as support media in electrophoresis, comprising the steps of
    forming a lamination by inserting said membrane between a pair of moisture-absorbent sheets;
    sandwiching said lamination between the convex surfaces of a pair of curved, apertured, resilient plates;
    clamping together the outwardly curving ends of said plates thereby forming a flat assembly and causing substantially uniform pressure to be applied across the surfaces of said lamination; and
    allowing said lamination to dry by evaporation to the atmosphere through said apertures.
2. A method as defined in claim 1 which includes the step of
    force-flowing warm air over the outer surfaces of said lamination through said apertured members to accelerate drying of said lamination.
3. An apparatus for drying thin membranes such as those used as support media in electrophoresis, comprising a pair of moisture-absorbent sheets for receiving said membrane in between;

a pair of opposed, curved, resilient frame members for engaging the outer surface of said pair of blotters between the convex surfaces thereof, said frames having apertures to allow evaporation of moisture from said blotters to the atmosphere; and clamping means for engaging and holding together the adjacent spread ends of said frame members whereby a substantially flat assembly is formed and substantially uniform pressure applied to said membranes during drying.

4. An apparatus as defined in claim 3 in which said frame members are made of stainless steel mesh.

5. An apparatus as defined in claim 3 in which said clamping means comprise U-shaped clips for engaging said ends of said frame members.

References Cited

UNITED STATES PATENTS

| | | | |
|---|---|---|---|
| 1,049,427 | 1/1913 | Wedmark | 34—71 X |
| 2,521,100 | 9/1950 | Sublette | 34—239 X |

JOHN J. CAMBY, *Acting Primary Examiner.*